(12) United States Patent
Lee et al.

(10) Patent No.: US 12,587,587 B2
(45) Date of Patent: Mar. 24, 2026

(54) METHOD AND DEVICE FOR SESSION BREAKOUT OF HOME ROUTED SESSION IN VISITED PLMN IN WIRELESS COMMUNICATION SYSTEM

(71) Applicant: Samsung Electronics Co., Ltd., Gyeonggi-do (KR)

(72) Inventors: Jicheol Lee, Gyeonggi-do (KR); Hyesung Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 352 days.

(21) Appl. No.: 17/961,791

(22) Filed: Oct. 7, 2022

(65) Prior Publication Data

US 2023/0116405 A1    Apr. 13, 2023

(30) Foreign Application Priority Data

Oct. 7, 2021    (KR) ......................... 10-2021-0133276

(51) Int. Cl.
*H04L 67/141* (2022.01)
*H04W 8/06* (2009.01)
(Continued)

(52) U.S. Cl.
CPC ............. *H04L 67/141* (2013.01); *H04W 8/06* (2013.01); *H04W 8/082* (2013.01); *H04W 76/00* (2013.01);
(Continued)

(58) Field of Classification Search
CPC ....... H04L 67/141; H04L 64/14; H04L 67/00; H04L 47/70; H04W 84/042; H04W 8/082;
(Continued)

(56) References Cited

U.S. PATENT DOCUMENTS

2019/0200264 A1    6/2019    Kim et al.
2019/0387576 A1    12/2019    Yang et al.
(Continued)

FOREIGN PATENT DOCUMENTS

KR    1020220118273    8/2022
WO    WO 2020/164763    8/2020
WO    WO 2021/119627    6/2021

OTHER PUBLICATIONS

3GPP TS 23.501 (V1.2.0, Jul. 26, 2017, release 15, p. 52) (Year: 2017).*
(Continued)

*Primary Examiner* — Paul H. Masur
*Assistant Examiner* — Gary A Miller
(74) *Attorney, Agent, or Firm* — The Farrell Law Firm, P.C.

(57) ABSTRACT

The disclosure relates to a 5G communication system communication scheme and a system thereof to support a higher data rate than that of the 4G system. In a wireless communication system, a method is provided that is performed by a first entity configured to manage a protocol data unit session in a wireless communication system that includes receiving, from a second entity, a session management-related request message including a visited session breakout (VSBO) allowed indicator; determining whether to create a VSBO session based on the session management-related request message; transmitting a session create request message to a third entity; and receiving, from the third entity, a session create response message including whether to allow a VSBO.

14 Claims, 9 Drawing Sheets

(51) Int. Cl.

| | |
|---|---|
| *H04W 8/08* | (2009.01) |
| *H04W 76/00* | (2018.01) |
| *H04W 76/12* | (2018.01) |
| *H04W 88/14* | (2009.01) |
| *H04W 84/04* | (2009.01) |

(52) U.S. Cl.
CPC ........... *H04W 76/12* (2018.02); *H04W 88/14* (2013.01); *H04W 84/042* (2013.01)

(58) Field of Classification Search
CPC ....... H04W 8/06; H04W 76/00; H04W 88/14; H04W 76/25; H04W 76/15; H04W 76/10; H04W 88/16; H04W 88/10; H04W 8/065; H04W 84/00; H04W 84/02; H04W 8/02; H04W 8/08
See application file for complete search history.

(56) References Cited

U.S. PATENT DOCUMENTS

| | | | | |
|---|---|---|---|---|
| 2021/0136864 A1* | 5/2021 | Gan et al. | ............. | H04W 80/10 |
| 2021/0219124 A1* | 7/2021 | Ying et al. | ........... | H04W 48/18 |
| 2024/0236840 A1* | 7/2024 | Li et al. | ................ | H04W 48/18 |

OTHER PUBLICATIONS

3GPP TS 23.502 (V.0.5.0, Jul. 14, 2017, release 15, p. 49-50) (Year: 2017).*

International Search Report dated Jan. 16, 2023 issued in counterpart application No. PCT/KR2022/015162, 6 pages.

3GPP TS 23.501 V1.2.0, (Jul. 2017), p. 166.

3GPP TS 23.502 V0.5.0, (Jul. 2017), p. 148.

LG Electronics, "TS 23.501: Clause 5.6.1 Overview Update—Subscription Info Access of V-SMF in Home Routed Mode Roaming", S2-171469, Feb. 13-17, 2017, 3 pages.

3GPP TS 23.501 V17.2.0, (Sep. 2021), p. 542.

3GPP TS 23.502 V17.2.1, (Sep. 2021) p. 712.

European Search Report dated Dec. 23, 2024 issued in counterpart application No. 22878962.4-1215, 14 pages.

* cited by examiner

METHOD AND DEVICE FOR SESSION BREAKOUT OF HOME ROUTED SESSION IN VISITED PLMN IN WIRELESS COMMUNICATION SYSTEM

CROSS-REFERENCE TO RELATED APPLICATION(S)

This application is based on and claims priority under 35 U.S.C. § 119 to Korean Patent Application No. 10-2021-0133276, which was filed in the Korean Intellectual Property Office on Oct. 7, 2021, the entire disclosure of which is incorporated herein by reference.

BACKGROUND

1. Field

The disclosure generally relates to a wireless communication system and, more specifically, to a method and device for managing a session of a roaming user equipment (UE).

2. Description of the Related Art

To meet the demand for wireless data traffic that has soared since the fourth generation (4G) communication system came to the market, there have been ongoing efforts to develop enhanced fifth generation (5G) communication systems or pre-5G communication systems. For the reasons below, the 5G communication system or pre-5G communication system is called the beyond 4G network communication system or post LTE system.

For higher data transmit rates, 5G communication systems are considered to be implemented on ultra-high frequency bands (mmWave), e.g., 60 GHz. To mitigate pathloss on the ultra-high frequency band and increase the reach of radio waves, various techniques are taken into account for the 5G communication system, including beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (RAN), ultra-dense network, device-to-device (D2D) communication, wireless backhaul, moving network, cooperative communication, coordinated multi-point (CoMP), and interference cancellation.

Other schemes under development for the 5G system include, e.g., hybrid frequency shift keying (FSK) and quadrature amplitude modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Meanwhile, the third-generation partnership project (3GPP), which is in charge of cellular mobile communication standardization, has named the new core network structure 5G core (5GC) and standardized the same to promote the evolution from the legacy 4G LTE system to the 5G system.

5GC supports the following differentiated functions as compared to the evolved packet core (EPC), which is the legacy network core for 4G.

First, 5GC adopts a network slicing function. As a requirement of 5G, 5GC should support various types of terminals and services, e.g., enhanced mobile broadband (eMBB), ultra-reliable low latency communications (URLLC), or massive machine type communications (mMTC). These UEs/services have different requirements for the core network. For example, the eMBB service requires a high data rate while the URLLC service requires high stability and low latency. Network slicing is proposed to meet such various requirements.

Network slicing is a method for creating multiple logical networks by virtualizing one physical network, and the network slice instances (NSIs) may have different characteristics. Therefore, various service requirements may be met by allowing each NSI to have a network function (NF) suited for its characteristics. Various 5G services may be efficiently supported by allocating NSI meeting required service characteristics for each UE.

Second, 5GC may seamlessly support the network virtualization paradigm by separating the mobility management function and the session management function. In legacy 4G LTE, all UEs may receive services over the network through signaling exchange with a single core device called the mobility management entity (MME), which is in charge of registration, authentication, mobility management and session management functions. However, in 5G, the number of UEs explosively increases and mobility and traffic/session characteristics that must be supported according to the type of UE are subdivided. Thus, if all functions are supported by a single device, such as the MME, the scalability of adding entities for each required function may decrease. Accordingly, various functions are under development based on a structure that separates the mobility management function and the session management function to enhance the scalability in terms of function/implementation complexity of the core equipment in charge of the control plane and the signaling load.

Although provided through a protocol data unit (PDU) session of a visited network even through a local breakout PDU session, which is session managing technology provided from the conventional visited public land mobile (PLMN) data network, when handover occurs to the home PLMN in a roaming situation, two PDU sessions are required. To distinguish the two PDU sessions, two or more data network names (DNNs) are needed and, to control it, a UE route selection policy (URSP) rule needs to be utilized, which is complicated.

SUMMARY

The disclosure has been made to address at least the above-mentioned problems and/or disadvantages and to provide at least the advantages described below.

Aspects of the disclosure provide a method and device for supporting a session breakout method by adding/modifying/deleting a local UPF in the visited network for the home routed session of the roaming UE in the wireless communication system.

Aspects of the disclosure provide a technique for enabling access to an edge application server (EAS) provided in the edge of a computing environment of the VPLMN using an uplink classifier (hereinafter, referred to as ULCL)/branching point (hereinafter, referred to as BP) technology which is the 5G session managing function in the visited PLMN (VPLMN) using the home routing session.

Aspects of the disclosure provide a method for enabling simultaneous access to the local DN provided from the visited network and to the data network (DN) provided from the home network in one PDU session.

A method performed by a first entity configured to manage a PDU session in a wireless communication system is provided, including receiving, from a second entity, a session management-related request message including a visited session breakout (VSBO) allowed indicator; determining whether to create a VSBO session based on the session management-related request message; transmitting a session create request message to a third entity; and receiving, from the third entity, a session create response message including whether to allow a VSBO.

A first entity configured to manage a PDU session in a wireless communication system is provided, with the first entity including a transceiver and a controller configured to control the transceiver to receive, from a second entity, a session management-related request message including a VSBO allowed indicator; determine whether to create a VSBO session based on the session management-related request message; control the transceiver to transmit a session create request message to a third entity; and control the transceiver to receive, from the third entity, a session create response message including whether to allow a VSBO.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Figure 1:
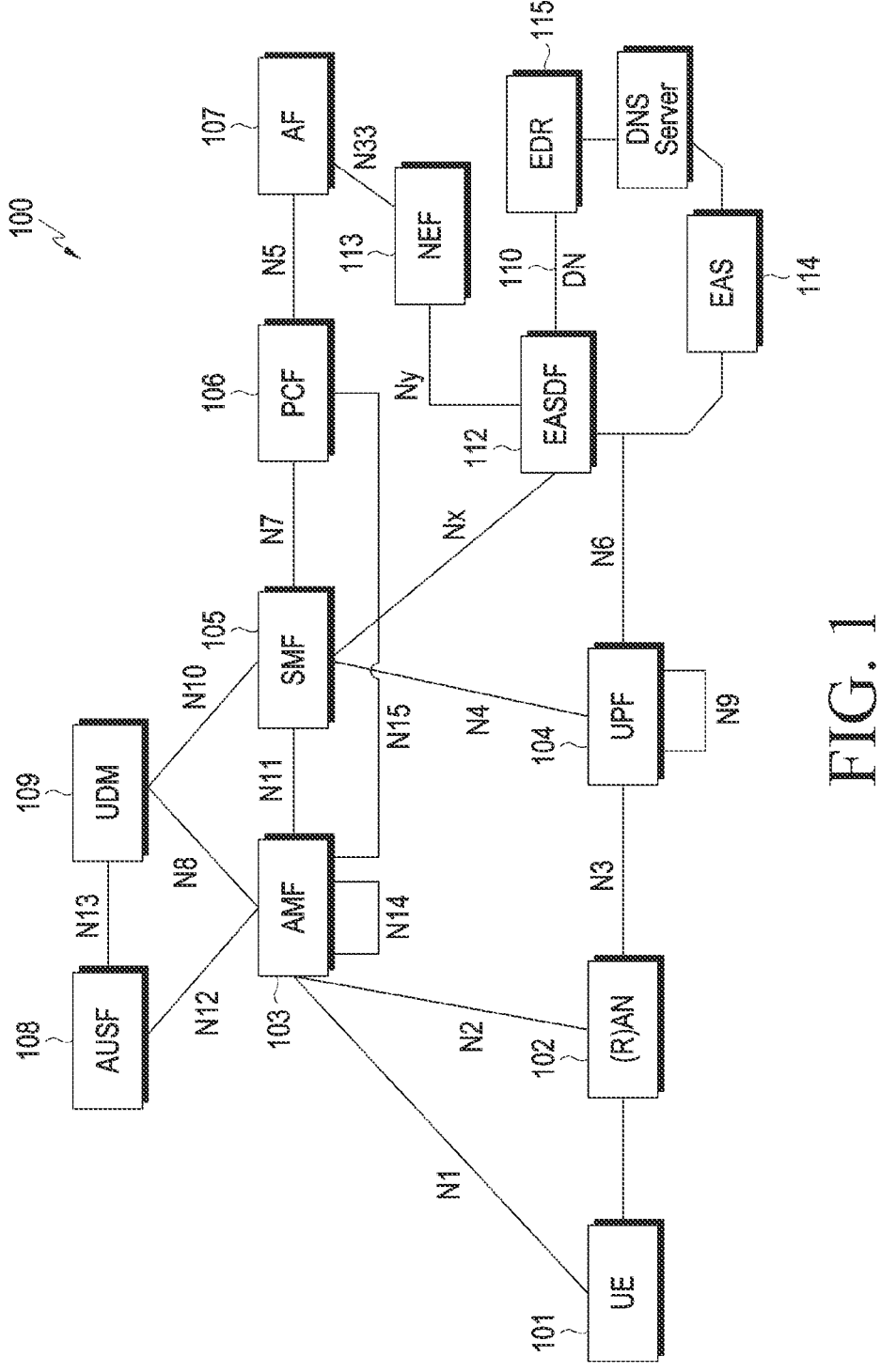
FIG. 1 illustrates a 5G system network environment structure according to an embodiment.

Hereinafter, embodiments are described in detail with reference to the accompanying drawings, with descriptions of techniques which are well known in the technical field to which the disclosure pertains that are not directly related to the disclosure being omitted. The terms as used herein are defined considering the functions in the disclosure and may be replaced with other terms according to the intention or practice of the user or operator. Therefore, the terms should be defined based on the overall disclosure. For the same reasons, some elements may be exaggerated or schematically shown. The size of each element does not necessarily reflect the actual size of the element. The same reference numeral is used to refer to the same element throughout the drawings, unless otherwise noted. Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the present disclosure.

The terms referring to network entities and objects of an edge computing system as used herein, the terms referring to messages, and the term referring to identification information are provided as an example for ease of description, and such terms may be replaced with other terms denoting objects with equivalent technical concept.

Although terms and names as defined in the 5G system standard are used herein for ease of description, embodiments of the present disclosure are not limited thereto or thereby, and the same may apply likewise to systems conforming to other standards.

The electronic device according to various embodiments may be one of various types of electronic devices. The electronic devices may include, for example, a portable communication device (e.g., a smart phone), a portable multimedia device, a portable medical device, a camera, a wearable device, or a home appliance, without being limited to the above-listed embodiments. It is to be understood that a singular form of a noun corresponding to an item may include one or more of the things, unless the relevant context clearly indicates otherwise.

As used herein, phrases such as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as 1st and 2nd, or first and second may be used to simply distinguish a corresponding component from another, and does not limit the components in other aspect (e.g., importance or order). It is to be understood that if an element (e.g., a first element) is referred to, with or without the terms operatively or communicatively, as coupled with, coupled to, connected with, or connected to another element (e.g., a second element), it means that the element may be coupled with the other element directly (e.g., wired), wirelessly, or via a third element.

As used herein, the term module may include a unit implemented in hardware, software, or firmware, and may interchangeably be used with other terms, for example, logic, logic block, part, or circuitry. A module may be a single integral component, or a minimum unit or part thereof, adapted to perform one or more functions. According to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by the electronic device. For example, a processor of the electronic device may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the electronic device may be provided in the form of a non-transitory storage medium. Wherein, the term non-transitory means that the storage medium is a tangible device, and does not include a signal, e.g., an electromagnetic wave, without differentiating between where data is semi-permanently stored in the storage medium and where the data is temporarily stored in the storage medium.

According to an embodiment, a method may be included and provided in a computer program product. The computer program products may be traded as commodities between sellers and buyers. The computer program product may be distributed in the form of a machine-readable storage medium (e.g., compact disc read only memory (CD-ROM) or digital video disc (DVD)-ROM), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

The 5G network technology and edge computing technology shown in the drawings and described in the description of the disclosure refers to the standards (e.g., TS 23.558) defined by the International Telecommunication Union (ITU) or 3GPP, and each of the components included in the network environment of FIG. 1 described below may mean a physical entity unit or a software or module unit capable of performing an individual function.

According to an embodiment, electronic device may refer to various devices used by the user. For example, electronic device may mean a terminal, UE, mobile station, subscriber station, remote terminal, wireless terminal, or user device. In the embodiments described below, a UE is used as an example of the electronic device for convenience purposes.

According to an embodiment, an access network (AN) may provide a channel for wireless communication with the electronic device. AN may mean a RAN, a base station, an eNB, an eNodeB, a 5G node, a transmission/reception point (TRP), or a 5th generation NodeB (SGNB). According to an embodiment, a core network (CN) may manage at least one of subscriber information, mobility, access authorization, data packet traffic, or billing policy for the UE. The CN may include at least one of a user plane function (UPF) node, an AMF node, an SMF node, a unified data management (UDM) node, or a policy control function (PCF) node. For the functions and operations of the nodes (or entities) included in the CN, the standards (e.g., TS 23.501) defined by the 3GPP may be referred to.

Edge computing has been proposed to host the service of the operator and/or a third party close to an access point, such as a base station, and reduce the end-to-end latency and load of the network to provide an efficient service. Such edge computing technology may shorten the data processing time by processing data in real time in a short distance from the site where the data is generated without transmitting the data generated from UEs to a central cloud network. For example, edge computing technology may be applied to technical fields, e.g., autonomous vehicles, that require rapid processing in various situations that may occur while driving. Edge computing of a network architecture enables a cloud computing function and a service environment, and a network for edge computing may be deployed near the UE. Edge computing offers advantages, such as reduced latency, increased bandwidth, reduced backhaul traffic, and prospects for new services over cloud environments. The 5G- or 6G- or its subsequent-generation CN proposed by the 3GPP may expose network information and functions to edge computing applications.

The disclosure relates to technology for mobile edge computing in which the UE establishes a data connection to an edge data network (EDN) located close to the UE to make use of a broadband service and accesses the EAS driven on the edge computing platform or the edge hosting environment operated by the edge enabler server (EES) of the EDN to thereby use data services.

Hereinafter, the base station (BS) may be an entity allocating resource to terminal and may be at least one of eNodeB, Node B, BS, RAN, AN, RAN node, wireless access unit, base station controller, or node over network. The terminal may include a UE, (user equipment), a mobile station (MS), cellular phone, smartphone, computer, or multimedia system capable of performing communication functions.

Downlink (DL) refers to a wireless transmission path of signal transmitted from the base station to the terminal, and uplink (UL) refers to a wireless transmission path of signal transmitted from the terminal to the base station. Although LTE or LTE-A system is described in connection with embodiments as an example, embodiments may also apply to other communication systems with similar technical background or channel form. For example, 5G mobile communication technology (5G, new radio (NR)) developed after LTE-A may be included in systems to which embodiments are applicable, and 5G below may be a concept including legacy LTE, LTE-A and other similar services. Further, embodiments may be modified in such a range as not to significantly depart from the scope of the disclosure under the determination by one of ordinary skill in the art and such modifications may be applicable to other communication systems. It should be appreciated that the blocks in each flowchart and combinations of the flowcharts may be performed by computer program instructions.

Since the computer program instructions may be equipped in a processor of a general-use computer, a special-use computer or other programmable data processing devices, the instructions executed through a processor of a computer or other programmable data processing devices perform the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Each block may represent a module, segment, or part of a code including one or more executable instructions for executing a specified logical function(s). In some replacement execution examples, the functions mentioned in the blocks may occur in different orders. For example, two blocks that are consecutively shown may be performed substantially simultaneously or in a reverse order depending on corresponding functions. As used herein, the term unit means a software element or a hardware element such as a field-programmable gate array (FPGA) or an ASIC. A unit may play a certain role. However, the term unit is not limited as meaning a software or hardware element. A unit may be configured in a storage medium that may be addressed or may be configured to reproduce one or more processors. Accordingly, as an example, a unit includes elements, such as software elements, object-oriented software elements, class elements, and task elements, processes, functions, attributes, procedures, subroutines, segments of program codes, drivers, firmware, micro-codes, circuits, data, databases, data architectures, tables, arrays, and variables. A function provided in an element or a unit may be combined with additional elements or may be split into sub elements or sub units. Further, an element or a unit may be implemented to reproduce one or more CPUs in a device or a security multimedia card, and a " . . . unit" may include one or more processors.

FIG. 1 illustrates a 5G system network environment structure according to an embodiment. The network entity included in the network structure of the 5G system of FIG. 1 may include an NF according to system implementation.

Referring to FIG. 1, the network structure of the 5G system 100 may include various network entities. As an example, the 5G system 100 may include an authentication server function (AUSF) 108, a (core) AMF 103, an SMF 105, a PCF 106, an application function (AF) 107, a (UDM 109, a DN 110, a network exposure function (NEF) 113, an edge application service domain repository (EDR) 115, an EAS 114, an EAS discovery function (EASDF) 112, UPF 104, a radio access network (RAN) 102, and a UE, i.e., the user equipment (UE) 101.

According to various embodiments, each NF of the 5G system 100 supports the following functions.

The AUSF 108 processes and stores data for authenticating the UE 101.

The AMF 103 provides functions for per-UE access and mobility management and may basically connect to one AMF per UE. For example, the AMF 103 supports such functions as inter-CN node signaling for mobility between 3GPP access networks, RAN CP interface (i.e., N2 interface) termination, NAS signaling termination (N1), NAS signaling security (NAS ciphering) and integrity protection, AS security control, registration management (registration area management), connectivity management, idle mode UE reachability (including controlling and performing paging retransmission), mobility management control (subscription and policy), intra-system mobility and inter-system mobility support, support of network slicing, SMF selection, lawful intercept (for interface to AMF event and LI system), transfer of session management (SM) messages between UE 101 and SMF 105, transparent proxy for SM message routing, access authentication, access authorization including a roaming authority check, transfer of SM messages between UE 101 and SMF 105, security anchor function (SAF), and security context management (SCM). All or some of the functions of the AMF 103 may be supported in a single instance of one AMF.

The DN 110 includes, e.g., an operator service, Internet access, or a third party service. The DN 110 transmits a PDU to the UPF 104 or receives a PDU transmitted from UE 101 from UPF 104. As shown in FIG. 1, DN 110 may include the EASDF 112, the EDR 115, a DNS server and the EAS 114.

The PCF 106 receives information about packet flow from the application server and provides the function of determining the policy such as mobility management or session management. Specifically, the PCF 106 supports functions such as support of a signalized policy framework for controlling network operations, providing a policy rule to allow CP function(s) (e.g., AMF or SMF) to execute a policy rule, and implementation of a front end for accessing subscription information related to policy decision in the user data repository (UDR).

The SMF 105 provides session management function and, if UE has multiple sessions, the multiple sessions may be managed per session by a different SMF. Specifically, the SMF 105 supports such functions as session management (e.g., session establishment, modification, and release including maintaining tunnel between the UPF 104 and the RAN 102, UE IP address allocation and management (optionally including authentication), selection and control of a UP function, traffic steering settings for routing traffic to a proper destination in UPF 104, interface termination towards policy control functions, execution of control part of policy and qualify of service (QoS), lawful intercept (for interface to SM event and LI system), termination of SM part of NAS message, downlink data notification, AN-specific SM information publisher (transferred from the AMF 103 via N2 to the RAN 102), SSC mode decision of session, and roaming function. All or some of the functions of the SMF 105 may be supported in a single instance of one SMF.

The UDM 109 stores, e.g., user's subscription data and policy data. The UDM 109 includes two parts, i.e., an application front end (FE) and UDR.

The FE of the UDM is in charge of location management, subscription management, and credential processing, and PCF in charge of policy control. The UDR stores data required for the functions provided by UDM-FE and the policy profile required by PCF. Data stored in the UDR includes policy data and user subscription data including session-related subscription data and access and mobility-related subscription data, security credential, and subscription identity. The UDM-FE accesses the subscription information stored in UDR and supports such functions as authentication credential processing, user identification handling, access authentication, registration/mobility management, subscription management, and SM management.

The UPF 104 transfers a DL PDU, received from the DN 110, to the UE 101 via N2 to the RAN 102 and transfers the PDU, received from the UE 101 via N2 to the RAN 102, to the DN 110. Specifically, the UPF 104 supports such functions as an anchor point for intra/inter RAT mobility, external PDU session point of interconnection to data network, packet routing and forwarding, packet inspection and user plane part of policy rule, lawful intercept, traffic usage reporting, uplink classifier for supporting routing of traffic flow to data network, branching point for supporting multihome PDU session, QoS handling (e.g., packet filtering, gating, uplink/downlink rate execution) for user plane, UL traffic verification (mapping between service data flow (SDF) and QoS flow), transport level packet marking in UL and DL, DL packet buffering, and DL data notification triggering. All or some of the functions of the UPF 104 may be supported in a single instance of one UPF.

The AF 107 interacts with the 3GPP core network for providing services, e.g., supporting such functions as application influence on traffic routing, network capability exposure approach, and interactions with policy framework for policy control).

The RAN 102 collectively refers to new radio access technologies that support at least one of an evolved universal mobile telecommunications system (UMTS) terrestrial radio access (evolved E-UTRA), which is an evolution from 4G radio access technology, and NR access technology (e.g., gNB).

gNB supports functions for radio resource management (i.e., radio bearer control, radio admission control, connection mobility control, dynamic allocation of resources (i.e., scheduling) to UE on uplink/downlink), Internet protocol (IP) header compression, encryption and integrity protection of user data stream, where routing to AMF is not determined from information provided to UE, selection of an AMF when UE attaches, routing of user plane data to UPF(s), routing of control plane information to AMF, connection setup and release, scheduling and transmission (generated from the AMF) of paging message, scheduling and transmission (generated from the AMF or operating and maintenance) of system broadcast information, measurement and measurement reporting configuration for mobility and scheduling, transport level packet marking on uplink, session management, support of network slicing, QoS flow management and mapping to data radio bearer, support of UE in inactive mode, distribution of NAS messages, NAS node selection, radio access network sharing, dual connectivity, and tight interworking between NR and E-UTRA.

UE 101 is a user device, which may be referred to as a terminal, mobile equipment (ME), MS, and portable device, such as a laptop computer, mobile phone, personal digital assistant (PDA), smartphone, or multimedia device or may be a non-portable device, e.g., a personal computer (PC) or vehicle-mounted device.

The NEF 113 provides capabilities and services for, e.g., third party, internal exposure/re-exposure, application functions, and edge computing, provided by the 3GPP network functions. The NEF 113 receives information based on exposed capability(ies) of other NF(s), from other NF(s). The NEF 113 may store the received information as structured data using a standardized interface to the data storage network function. The stored information may be re-exposed to other NF(s) and AF(s) by NEF and be used for other purposes, e.g., analysis.

The EASDF 112 is an NF that may add an extension mechanism for DNS (EDNS) client subnet option that may be expressed as an IP subnet address which should be added when forwarding the DNS request of the UE 101 and the address of the DNS server to forward the DNS request of the UE 101, per fully qualified domain name (FQDN). The EASDF 112 receives EAS domain configuration information from the EDR 115 and processes the DNS request message received from the UE according to the received information. Further, the EASDF 112 is an NF that receives the UE IP address and position information within 3GPP of the UE, DNS message handling rules, and DNS message reporting rules from the SMF 105, processes the DNS query message received from the UE and the DNS response message received from the DNS server, and transmits, to the SMF 105, information in the DNS message and statistic information obtained by processing it, according to the DNS message reporting rule.

According to various embodiments, in an NF repository function (NRF), all of the NFs illustrated in FIG. 1 may interact with the NRF if necessary.

An NRF supports a service discovery function, receives an NF discovery request from an NF instance and provides discovered NF instance information to the NF instance, and further maintains available NF instances and their supporting services.

Although FIG. 1 illustrates an example reference model in which the UE 101 accesses one DN 110 using one PDU session, the disclosure is not limited thereto.

The UE 101 may simultaneously access two data networks (i.e., local and central) using multiple PDU sessions. At this time, two SMFs may be selected for different PDU sessions. However, each SMF may have the capability of controlling both the local and central UPFs in the PDU session.

Further, the UE 101 may simultaneously access two (i.e., local and central) data networks provided in a single PDU session.

In a 3GPP system, a conceptual link connecting between NFs in the 5G system is defined as a reference point. As an example, reference point(s) included in the 5G system 100 of FIG. 1 are as follows.

N1: reference point between the UE 101, 201 and the AMF 103, 203

N2: reference point between (R)AN 102, 203 and AMF 103, 203

N3: reference point between (R)AN 102, 202 and UPF 104, 204

N4: reference point between the SMF 105, 205 and the UPF 104, 204

N5: reference point between the PCF 106 and the AF 107

N6: reference point between the UPF 104 and the DN 110

N7: reference point between the SMF 105 and the PCF 106

N8: reference point between the UDM 109 and the AMF 103

N9: reference point between two core UPFs 104

N10: reference point between the UDM 109 and the SMF 105

N11: reference point between the AMF 103 and the SMF 105

N12: reference point between the AMF 103 and the AUSF 108

N13: reference point between the UDM 109 and the AUSF 108

N14: reference point between at least two AMFs 103

N15: reference point between PCF 106 and AMF 107 in non-roaming scenario, and reference point between PCF 106 in visited network and AMF 107 in roaming scenario N33: reference point between the AF 107 and the NEF 113

Nx: reference point between the SMF 105 and the EASDF 112

Ny: reference point between the NEF (EDF) 113 and the EASDF 112

Figure 2:
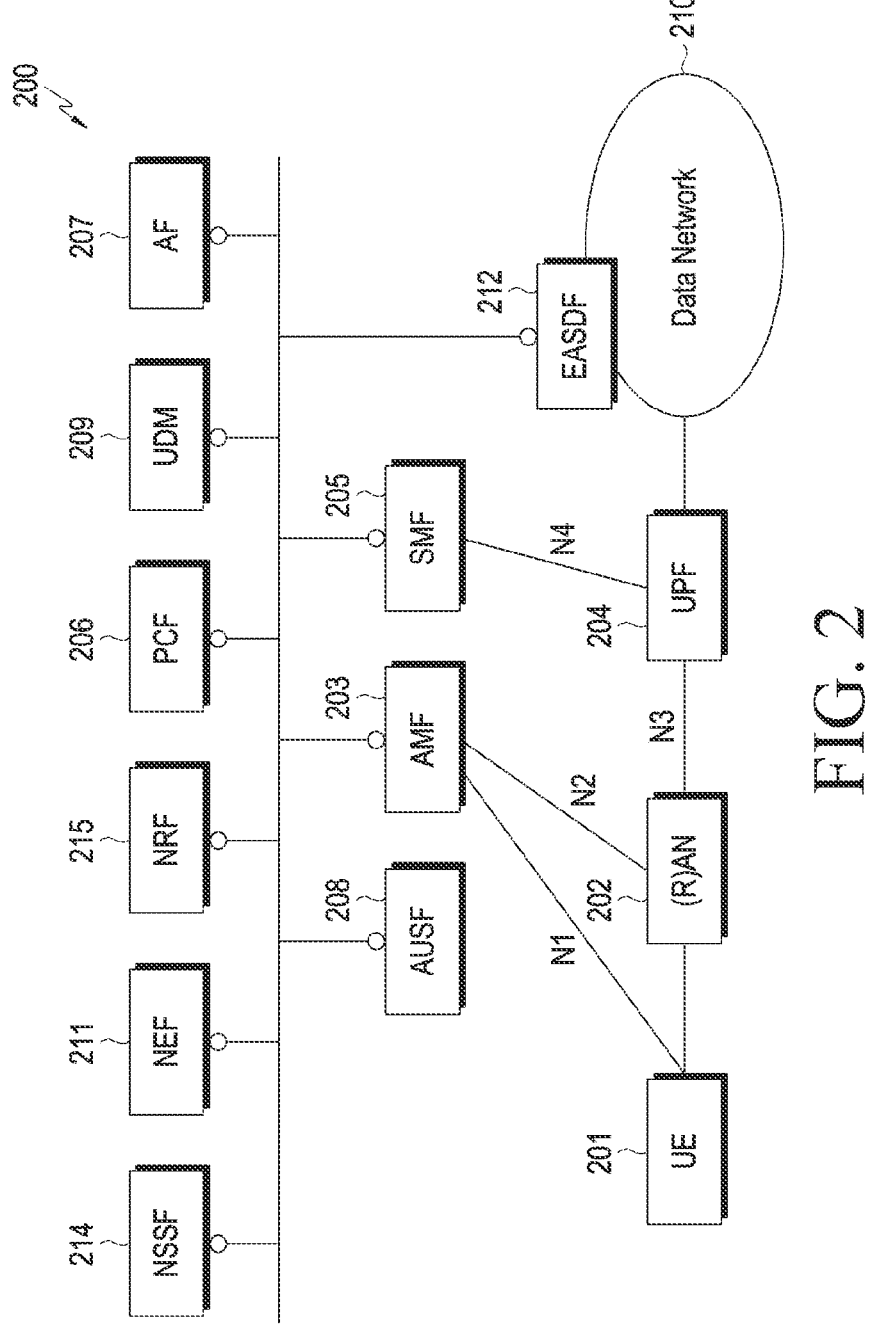
FIG. 2 illustrates a 5G system network environment structure according to an embodiment.

FIG. 2 illustrates a 5G system network environment structure according to an embodiment.

Referring to FIG. 2, the 5G system 200 may include a UE 201, a RAN 202, an AMF 203, a UPF 204, an SMF 205, a PCF 206, an AF 207, an AUSF 208, a UDM 209, a DN 210, an NEF 211, an EASDF 212, a network slicing selection function (NSSF) 214, and an NRF 215. The UE 201, RAN 202, AMF 203, UPF 204, SMF 205, PCF 206, AF 207, AUSF 208, UDM 209, DN 210, NEF 211, and EASDF 212 of FIG. 2 perform the same function as the UE 101, RAN 102, AMF 103, UPF 104, SMF 105), PCF 106, AF 107, AUSF 108, UDM 109, DN 110, EASDF 112 and NEF 113 of FIG. 1.

Referring to FIG. 2, the NSSF 214 may select a set of network slice instances serving the UE 201. Further, the NSSF 214 may determine granted network slice selection assistance information (NSSAI) and may perform mapping to subscribed single-network slice selection assistance information (S-NSSAI), if necessary. Further, the NSSF 214 may determine the configured NSSAI and may perform mapping to subscribed S-NSSAIs, if necessary. Further, the NSSF 214 may determine the AMF 203 set used to serve the UE 201 or query the NRF 215 according to the configuration to determine a list of candidate AMFs 203.

The NRF 215 supports a service discovery function, receives an NF discovery request from an NF instance, provides discovered NF instance information to the NF instance, and maintains available NF instances and their supporting services.

Various embodiments provide a method for managing a session according to movement of a UE in a cellular wireless communication system, e.g., a 5G system. Various embodiments are related to a method related to relocation of an application server accessed by a UE according to movement of the UE in edge computing.

In a conventional 3GPP 5G core network, relocation of the PDU session anchor-user plane function (PSA-UPF) does not take into account data path delay. In other words, in the conventional 3GPP 5G core network, the SMF used its own topology information to determine the relocation of the PSA-UPF. Various embodiments may provide a method for determining whether to relocate the PSA-UPF considering a delay in the data path by the 5G core network and the application program based on the request of the AF requiring a low-delay service.

The 5G core network and the application program determine the movement of the PSA-UPF considering the delay in the data path. If a handover occurs in which a UE receiving a service from one or more application programs leaves the service area in which the currently connected application program is placed, and a PSA-UPF movement is performed, and service interruption may occur as the IP address of the UE is changed.

Service interruption may be minimized by avoiding relocation of the PSA-UPF when the delay requested by the application program through the existing data path in the UE-moved area is met considering the delay requested by the application program.

According to various embodiments, it is possible to provide a service meeting at the delay time requested by the application program by reconfiguring a path to a new PSA-UPF when the UE moves so that service is provided through the newly changed path or when the delay requested by the application program is not met.

Figure 3:
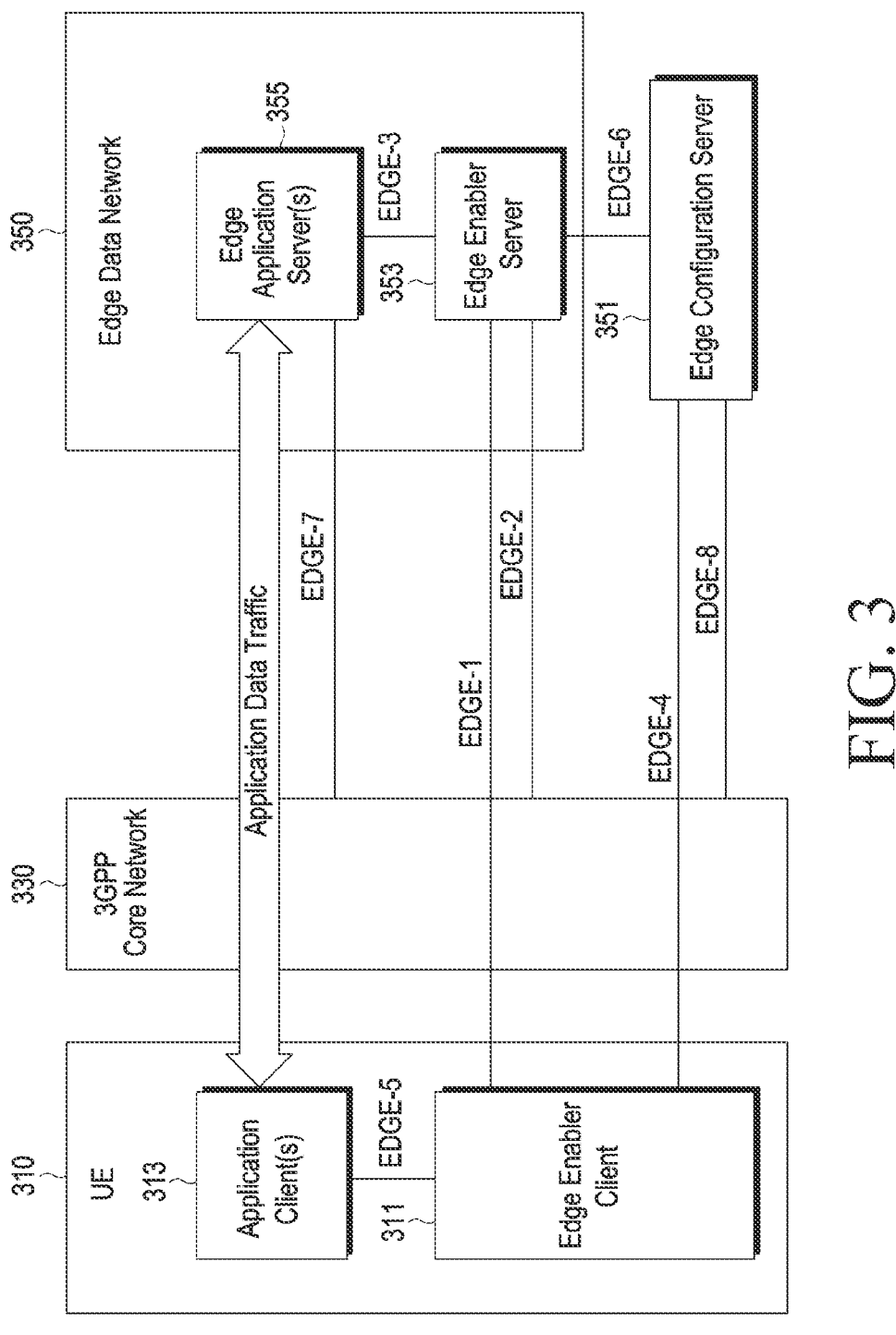
FIG. 3 illustrates a communication system supporting edge computing according to an embodiment.

FIG. 3 illustrates a communication system supporting edge computing according to an embodiment.

Referring to FIG. 3, an EDN 350 includes an EAS 355 and an EES 353. In FIG. 3, an edge configuration server (ECS) 351 provides configuration information related to the EDN 350. The EAS 355, the EES 353, and the ECS 351 interact with the core network 330 to provide edge computing services to the UE 310. The core network 330 may use, e.g., a 3GPP-based 5G or 6G or its subsequent next-generation core network. The UE 310 may include an application client 313 and an edge enabler client (EEC) 311. The UE 310 may further include an edge configuration client (ECC).

The EES 353 provides supporting functions necessary for the EAS 355 and the EEC 311. For example, the EES 353 may provide configuration information to the EAS 355 to enable exchange (transmission and reception) of application data traffic and provide information related to the EAS 355 to the EEC 311. The EEC 311 provides supporting functions necessary for the application client 313. For example, the EEC 311 retrieves configuration information to enable the exchange of application data traffic with the EAS 355 and provide the application data traffic to the application client 313, and may search for the EAS 355 available in the EDN.

In FIG. 3, the ECS 351 provides a supporting function necessary for the EEC 311 to connect to the EES 353. For example, the ECS 351 may provide, e.g., service area information and network address information (e.g., uniform resource identifier (URI)) for connecting the EEC 311 to the EES 353. The ECS 351 may be deployed in the communication service provider's mobile network operator (MNO) domain or the service provider's third party domain. The application client 313 is installed in the UE 310 to perform functions as a client and supports transmission and reception of application data traffic between the UE 310 and the EAS 355. The EAS 355 performs functions as a server for transmitting and receiving data traffic in the EDN. Although FIG. 1 illustrates one EAS 355, one EES 353, and one ECS 351 for convenience, each may be constituted of multiple servers.

In FIG. 3, EDGE-1 to EDGE-8 are network interfaces, i.e., reference points, between entities and are described in Table 1, below, without being limited to the descriptions therein.

TABLE 1

| Reference Points | Description |
|---|---|
| EDGE-1 | EDGE-1 reference point enables interactions between the Edge Enabler Server and the Edge Enabler Client. It supports: a) registration and de-registration of the Edge Enabler Client to the Edge Enabler Server; b) retrieval and provisioning of Edge Application Server configuration information; and c) discovery of Edge Application Servers available in the Edge Data Network. |

TABLE 1-continued

| Reference Points | Description |
|---|---|
| EDGE-2 | EDGE-2 reference point enables interactions between the Edge Enabler Server and the 3GPP Core Network. It supports access to 3GPP Core Network functions and APIs for retrieval of network capability information. |
| EDGE-3 | EDGE-3 reference point enables interactions between the Edge Enabler Server and the Edge Application Servers. It supports: a) registration of Edge Application Servers with availability information (e.g. time constraints, location constraints); b) de-registration of Edge Application Servers from the Edge Enabler Server; and c) providing access to network capability information (e.g. location information). |
| EDGE-4 | EDGE-4 reference point enables interactions between the Edge Configuration Server and the Edge Enabler Client. It supports provisioning of Edge configuration information to the Edge Enabler Client. |
| EDGE-5 | EDGE-5 reference point enables interactions between Application Client(s) and the Edge Enabler Client. |
| EDGE-6 | EDGE-6 reference point enables interactions between the Edge Configuration Server and the Edge Enabler Server. It supports registration of Edge Enabler Server information to the Edge Enabler Network Configuration Server. |
| EDGE-7 | EDGE-7 reference point enables interactions between the Edge Application Server and the 3GPP Core Network. It supports access to 3GPP Core Network functions and APIs for retrieval of network capability information. |
| EDGE-8 | EDGE-8 reference point enables interactions between the Edge Configuration Server and the 3GPP Core Network. |

Figure 4:
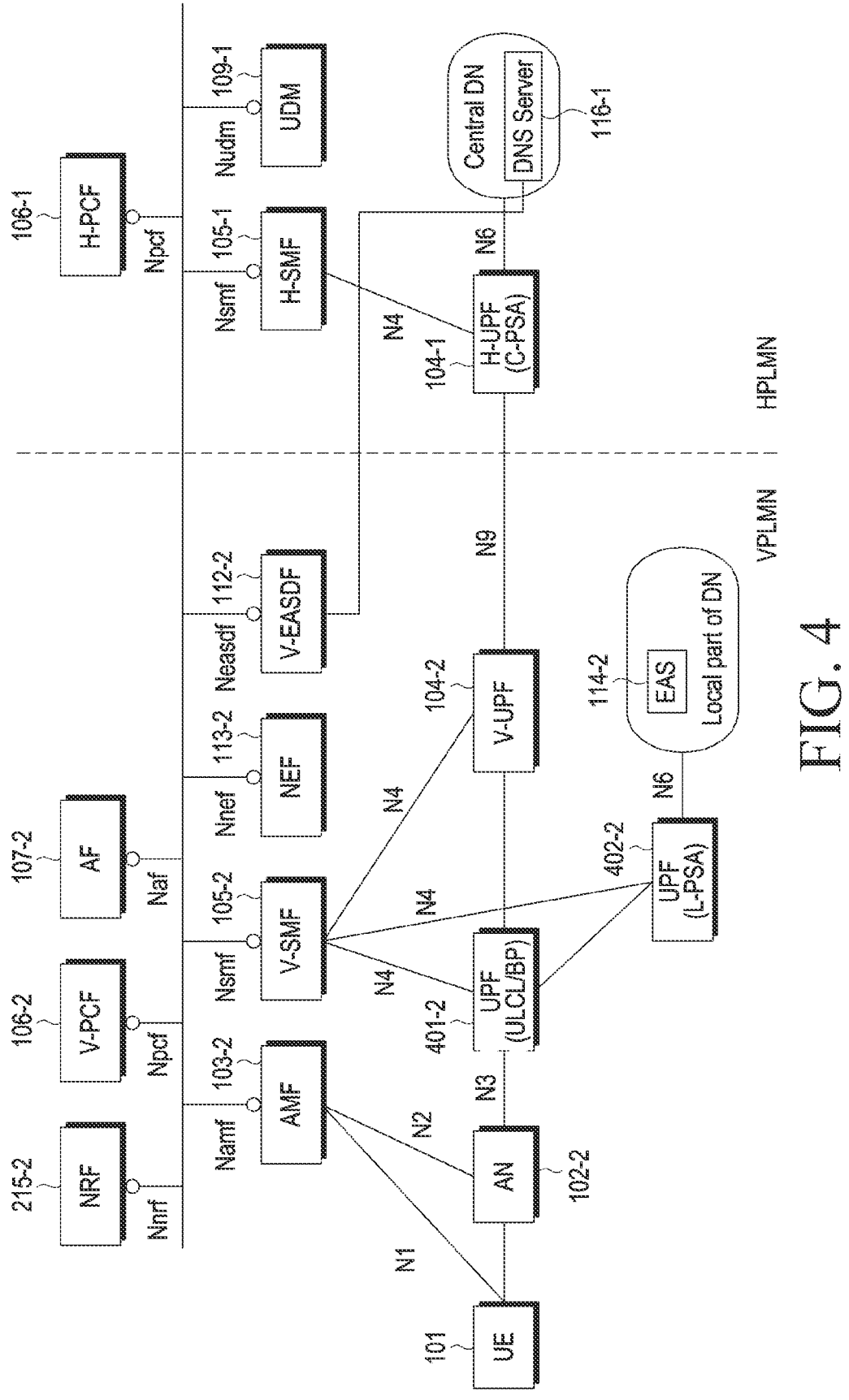
FIG. 4 illustrates a 5G system structure for accessing the EAS of an edge computing service operated by a visited network using ULCL/BP in a home routing roaming scenario according to an embodiment.

FIG. 4 illustrates a 5G system structure for accessing the EAS of an edge computing service operated by a visited network using ULCL/BP in a home routing roaming scenario according to an embodiment.

The NF of the visited network and the NFs of the home network are further described based on FIG. 2 below.

The visited network may include an AMF 103-2, a V-PCF 106-2, a V-SMF 105-2, a V-UPF 104-2, a V-EASDF 112-2, and a visited DNS server. Referring to FIG. 4, the AMF 103-2 exists in the VPLMN.

The AMF 103-2 receives and stores a visited session breakout (SBO) allowed indicator from the UDM 109-1 during the registration procedure of the UE 101. If the AMF 103-2 identifies the request for data network name/single-network slice selection assistance information (DNN/S-NSSAI) transmitted by the UE 101 in the PDU session creation procedure, the AMF 103-2 transmits the visited SBO allowed indicator to the V-SMF 105-2. In this case, since a request for the home routing session is transmitted, the AMF 103-2 also transmits the address and/or identifier of the H-SMF 105-1.

V-PCF 106-2 is a PCF of the VPLMN. The V-PCF 106-2 receives a report for the AF request from the AF 107-2 through the NEF 113-2 of the visited network, through an UDR, and may receive an AF influence traffic routing policy. The V-SMF 105-2 determines a policy for SBO based on the received AF influence traffic routing policy. The AF traffic influence from the AF 107-2 of the VPLMN is transferred to the V-SMF 105-2 through the following route: Visited AF 107-2→Visited NEF 113-2→Visited UDR→Visited PCF 106-2→Visited SMF 105-2.

V-SMF 105-2: performs tunnel management on the H-UPF 104-1 through the visited UPF 104-2. V-SMF 105-2 determines the session breakout (ULCL/BP) in the VPLMN and manages the user plane (UP) session for L-PSA UPF 402-2, ULCP/BP UPF 401-2, and V-UPF 104-2 through N4. The V-SMF 105-2 notifies the H-SMF 105-1 of the performing of a local UPF add/modify/delete event by transferring a visited network session breakout (V-SBO) indication. The V-SMF 105-2 is an NF that manages the session of the UE 101 in the visited network. If the UE 101 requests creation of a PDU session, the V-SMF 105-2 receives a request for creation of a PDU session from the AMF 103-2. The V-SMF 105-2 receives a request including a VSBO and H-SMF 105-1 identifiers/addresses from the AMF 103-2.

The V-SMF 105-2 receives a VSBO allowed from the AMF 103-2. In the case of a home routing session, if receiving the H-SMF 105-1 identifier/IP address from the AMF 103-2, the V-SMF 105-2 transfers a request for HR session creation to the H-SMF 105-1. An indicator to request to provide the VSBO in the HR session creation request and/or an indicator indicating that the VSBO function is supported is transmitted to the H-SMF 105-1. The V-SMF 105-2 may transfer the V-EASDF 112-2 address (visited DNS server address) to the H-SMF 105-1. The V-SMF 105-2 may notify the H-SMF 105-1 of the routing rule for the local data network (LDN). The V-SMF 105-2 determines whether to add/change/delete the ULCP/BP UPF 401-2 and L-PSA UPF 402-2. When the V-SMF 105-2 adds the ULCL/BP UPF 401-2, the network address for the LDN to be forwarded to the L-PSA UPF 402-2 may be reported to the H-SMF 105-1. The H-SMF 105-1 of the home PLMN is responsible for packet forwarding of the HR session.

V-UPF 104-2 is an NF that serves as an anchor in the visited network and performs downlink data packet buffering in the idle state of the UE 101. The V-UPF 104-2 performs packet forwarding through an N9 tunnel with the H-UPF 104-1. The V-UPF 104-2 is an NF that supports the ULCL/BP UPF 401-2 or L-PSA UPF 402-2 function. For example, the V-UPF 104-2 may be provided in a form in which the ULCL/BP UPF 401-2 or the L-PSA UPF 402-2 is separated.

L-PSA UPF 402-2 performs a local PSA UPF function. L-PSA UPF 402-2 connects to the LDN through N6 and performs forwarding of packets transmitted/received to/from the EAS 114-2.

ULCL/BP UPF 401-2 is an NF that branches the PDU and receives a packet forwarding rule corresponding to the uplink classifier from the V-SMF 105-2. ULCL/BP UPF 401-2 branches and forwards the packets, received from the UE 101, to the V-UPF 104-2 through the destination address of the UE 101 and/or the IPv6 prefix of the UE 101.

The following colocations are possible in a specific implementation model.

Colocation of ULCL/BP UPF and V-UPF

Colocation of L-PSA UPF and V-UPF

Colocation of ULCL/BP UPF, L-PSA UPF and V-UPF

V-EASDF 112-2 is an NF that performs an EAS discovery function in the VPLMN. The V-EASDF 112-2 located in the visited network is connected to the V-SMF 105-2. The V-EASDF 112-2 receives the DNS message handling rules for the session level and the node level from the V-SMF 105-2. The address of the V-EASDF 112-2 may be used as a DNS address transferred to protocol configuration options (PCOs) to the UE 101 when a PDU session is created or changed. The home DNS server address may be transferred to the V-EASDF 112-2 through a message processing rule for the DNS query from the V-SMF 105-2, and the DNS message handling rule may be used as the DNS server address for forwarding the DNS query of the V-EASDF 112-2 to allow the DNS query to the DNS server of the home network for resolution of the IP address for the FQDN included in the DNS query transmitted from the UE 101 that is not registered in the local network. Or, the DNS query may be used as the default DNS server address. The V-EASDF 112-2 exists in the LDN. In a specific implementation, a structure in which the V-UPF 104-2 and the V-EASDF 112-2 may be collocated is also possible.

The home public land mobile network (HPLMN) may be composed of a UDM 109-1, an H-PCF 106-1, an H-SMF 105-1, an H-UPF 104-1, and a home DNS server.

H-PCF 106-1 determines the policy for the home routed session.

UDM 109-1: records whether a VSBO is allowed or not for each DNN/S-NSSAI of the UE according to the roaming agreement between PLMNs in advance. The UDM 109-1 is an NF that serves to transfer whether to allow the VSBO to the AMF 103-2 during registration through the visited network of the UE 101. This is separate from the local breakout (LBO) allowed indicator. When the LBO allowed is set, the VSBO may be set to not be allowed.

H-SMF 105-1: receives the SM-related context from the UDM 109-1 and finally determine whether to support a VSBO. If the H-SMF 105-1 allows the VSBO, the H-SMF 105-1 transmits a VSBO allowed acknowledge (ACK) indicator to the V-SMF 105-2. The DNS server address of the PCO message transferred to the UE 101 is set as the address of the V-EASDF 112-2 provided by the V-SMF 105-2. The H-SMF 105-1 transfers a raw data collection request to the V-SMF 105-2 for collecting raw data for billing. The V-SMF 105-2 collects usage data from the V-UPF 104-2 through a usage reporting rule (URR).

The UE 101 exchanges 5G control plane messages through the AMF 103-2 and the SMFs 105-1 and 105-2. The UE 101 may access the EAS 114-2 through a PDU session through the H-UPFs 104-1 and the V-UPF 104-2 through the user plane. The UE 101 receives the DNS server address from the V-SMF 105-2. The UE 101 transfers the DNS query to the DNS server address.

Figure 5A:
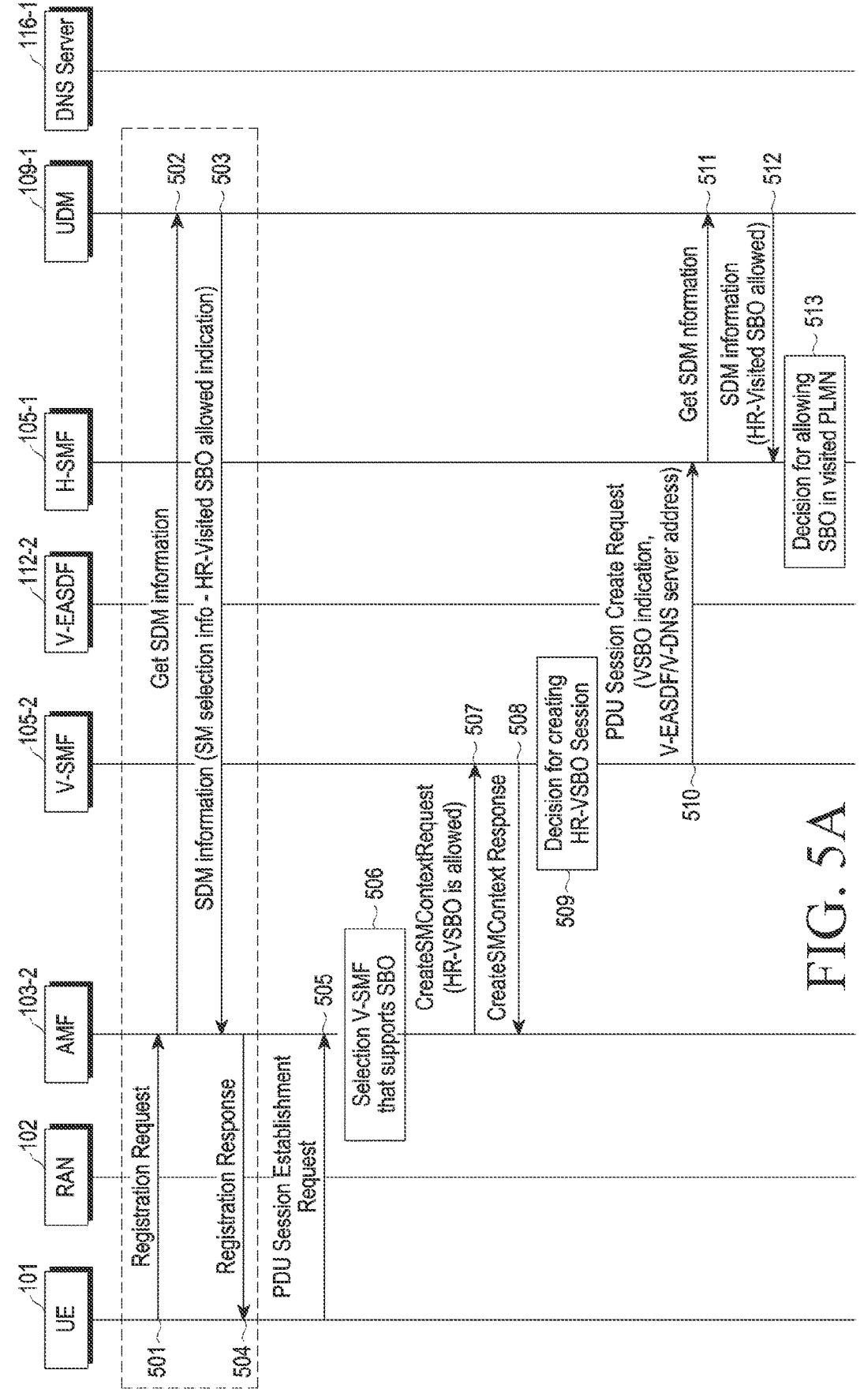
FIGS. 5A and 5B illustrate a session generating procedure that allows session breakout in a visited network in a home routing session according to an embodiment.
Figure 5B:
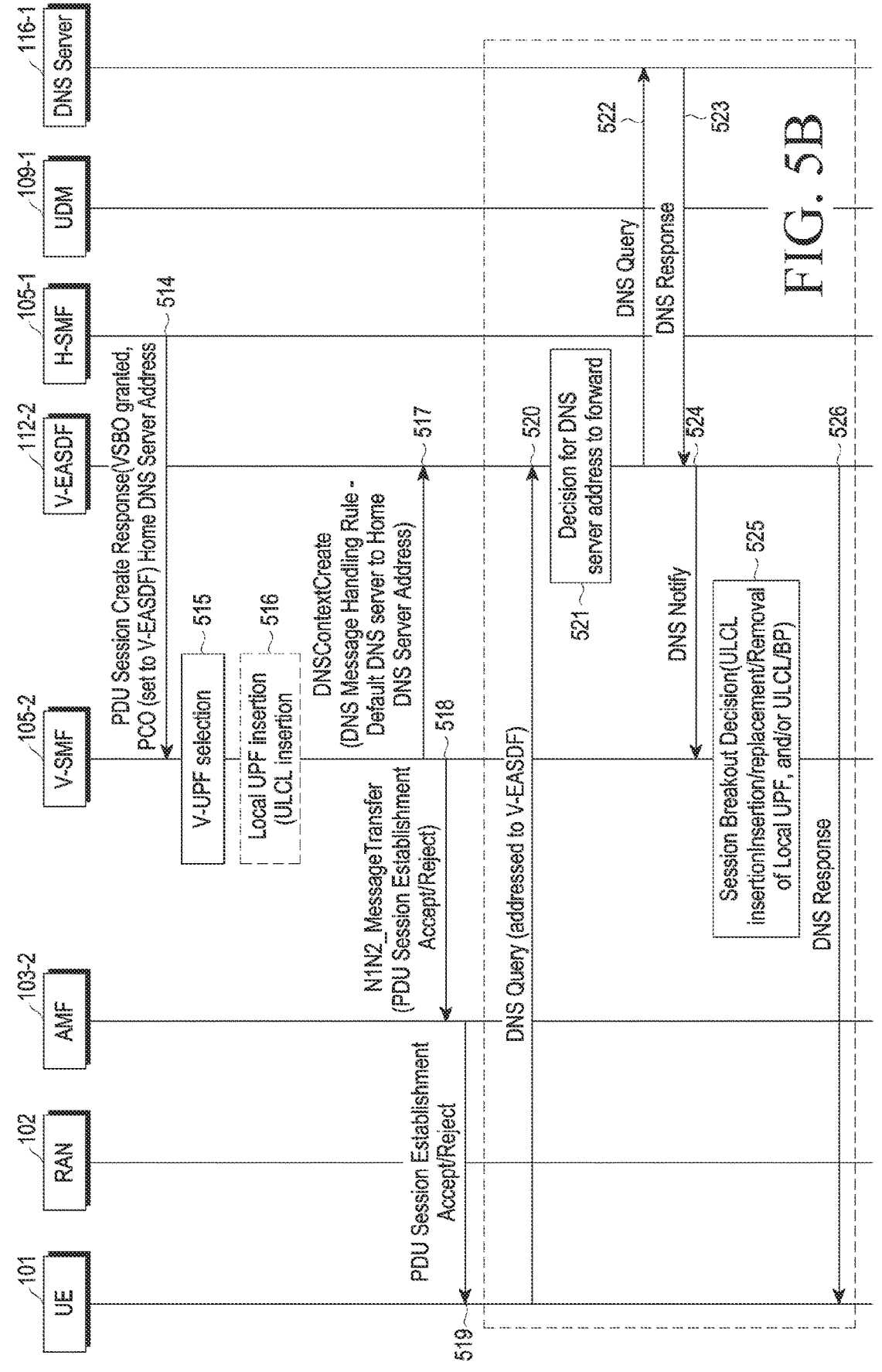

FIGS. 5A and 5B illustrate a session generating procedure that allows session breakout in a visited network in a home routing session according to an embodiment.

Referring to FIGS. 5A and 5B, the UE 101 initiates a registration procedure in a roaming area. The UE 101 transmits a registration request message to the AMF 103-2 at step 501. The AMF 103-2 receiving the registration request message from the UE 101 determines that the UE 101 is roaming and requests subscriber information for the UE 101 from the UDM 109-1 of the home PLMN at step 502. The UDM 109-1 of the home network of the UE 101 may store UE-related subscriber information including at least one piece of subscriber information about the DNN of the UE 101, whether local breakout (LBO) is allowed per S-NSSAI pair (e.g., (DNN1, S-NSSAI1) or (DNNI, S-NS-SAI2)), and whether session breakout is allowed in the visited network, according to a previous roaming agreement with the visited PLMN. The UDM 109-1 of the home network receiving the subscriber information request for the UE 101 from the AMF 103-2 transmits, to the AMF 103-2, subscriber information including whether session breakout is allowed in the visited network for the home routing session in the subscriber information of the UE 101 stored in the UDR. The AMF 103-2 receiving the subscriber information of the UE 101 stores the information in the context of the UE 101 at step 503. The AMF 103-2 successfully finishes the registration procedure for the UE and transmits a registration response message in response to the registration request of the UE 101 at step 504.

The UE 101 requests that the AMF 103-2 create a PDU session by URSP information received after the registration procedure and/or local setting in the UE 101 and/or a request of the application at step 505. The AMF 103-2 receives a PDU session creation request message from the UE 101. The AMF 103-2 identifies the subscriber information of the UE 101 and identifies whether a VSBO is allowed for the DNN, S-NSSAI information requested by the UE 101 and whether LBO is allowed. When LBO is allowed, the AMF 103-2 determines LBO and selects an SMF supporting the same at step 506. When LBO is not allowed, the AMF 103-2 transfers an H-SMF 105-1 identifier or H-SMF 105-1 address for home routing to the V-SMF 105-2. The H-SMF 105-1 identifier or H-SMF 105-1 address for the home PLMN of the UE 101 is previously set in the AMF 103-2. The AMF 103-2 transfers a PDU session CreateSMContext Request message for creating a PDU session to the V-SMF 105-2 for a home routing session at step 507. When the subscriber information of the home PLMN corresponding to the DNN, S-NSSAI included in the PDU session request message requested by the UE 101 includes the visited SBO (VSBO) allowed indicator, the AMF 103-2 may determine to allow SBO for the HR session. The V-SMF 105-2 receiving the CreateSMContext Request message may transmit a CreateSMContext Response message including an acknowledgment message to the AMF 103-2.

When the AMF 103-2 allows a VSBO, the AMF 103-2 may include at least one of the UE subscription identifier, an H-SMF address or identifier, a VSBO allowed indicator, and DNN, S-NSSAI information in the CreateSMContext Request message and transmit it. When the DNN sent from the UE 101 is not supported or is a target for DNN replacement and receives the DNN replacement performing policy provided by the PCF, the AMF 103-2 may request that the PCF perform the DNN replacement operation.

When, whether to allow a VSBO for the DNN which is the DNN replacement target is set in the AMF 103-2 by the previous roaming agreement, the AMF 103-2 may include a VSBO allowed indicator in the CreateSMContext and transmit the VSBO allowed indicator to the V-SMF 105-2. After receiving the CreateSMContext message from the AMF 103-2, the V-SMF 105-2 may determine to create an HR session and provide a session breakout based on at least one of the HR-VSBO allowed indicator included in the CreateSMContext message and H-SMF 105-1 information (e.g., H-SMF 105-1 identifier or H-SMF 105-1 address) at step 508.

When the V-SMF 105-2 does not support a VSBO, the V-SMF 105-2 does not provide the session breakout function. As an example, if the V-SMF 105-2 supports a VSBO and determines to provide the HR session at step 509, the V-SMF 105-2 transmits a PDU session create request message to the H-SMF 105-1 based on the H-SMF 105-1 identifier or address received from the AMF at step 510. The PDU session create request message may include a VSBO indicator, a V-EASDF 112-2 address, and a V-DNS server address. The VSBO indicator transmitted from the V-SMF 105-2 to the H-SMF 105-1 indicates that the V-SMF 105-2 may provide a session breakout function using the ULCL/BP, for the home routing PDU session currently requested.

Despite receiving the CreateSMContext Request message including the VSBO allowed indicator from the AMF 103-2, when the V-SMF 105-2 does not support the ULCL/BP and/or the V-SMF 105-2 does not support addition/modification/deletion of a local UPF in the area served by the V-SMF 105-2, when the UE 101 is not able to support session breakout in the currently located area and the visited network policy does not support session breakout, the V-SMF 105-2 may not provide session breakout. When the V-SMF 105-2 does not support a VSBO, the V-SMF may not transmit a VSBO indicator at step 509.

To provide a session breakout function corresponding to the EAS discovered through the DNS message of the UE 101 in interworking with the V-EASDF 112-2 by the V-SMF 105-2, the V-SMF 105-2 may set the address of the V-EASDF 112-2 which may interwork with the V-SMF 105-2, as the DNS server address for the PDU session currently created by the UE 101. The V-SMF 105-2 transmits the address of the V-EASDF 112-2 (e.g., the DNS server address to be set for the PDU session of the UE 101 by transmission to the UE 101 via PCO) to the H-SMF 105-1 at step 510.

The H-SMF 105-1 receiving the PDU session create request from the V-SMF 105-2 transmits a request message for obtaining subscriber information for the session to the UDM 109-1 at step 511. The UDM 109-1 receiving the request message for obtaining subscriber information from the H-SMF 105-1 transmits subscriber information for session to the H-SMF 105-1 at step 512. The H-SMF 105-1 identifies subscriber information and parameters included in the PDU session create request and determines whether to allow PDU session creation.

The subscriber information identified by the H-SMF 105-1 may be information that may be set in the H-SMF 105-1 itself and be identified through the subscriber information received from the UDM in step 511. The information identified by the H-SMF 105-1 may include information, such as DNN, S-NSSAI, SSC mode, PDU session type, and whether MA PDU session is allowed.

The H-SMF 105-1 may identify whether HR visited SBO is allowed with the subscriber information received at step 512 from the UDM 109-1 or the roaming agreement made with the subscriber's serving network at step 513. If the use of the SBO provided from the visited network is allowed, and the VSBO allowed indicator is received from the V-SMF 105-2, the H-SMF 105-1 may allow the V-EASDF 112-2 to be used as the DNS server address transmitted to the UE 101 based on the V-EASDF 112-2 address received from the V-SMF 105-2.

The H-SMF 105-1 sets the V-EASDF 112-2 as the DNS server address to be transmitted to the UE 101 and sets the V-EASDF 112-2 as the DNS address in the PCO field along with the PDU session allowed message, and transmits it to the UE 101. The H-SMF 105-1 transmits a PDU session create response message to the V-SMF 105-2 at step 514. The PDU session create response message transmitted from the H-SMF 105-1 may include the V-EASDF 112-2 address and the PCO value including the indicator determining whether to allow a VSBO and indicating to allow the VSBO.

When the H-SMF 105-1 transmits the indicator allowing a VSBO to the V-SMF 105-2 and transmits the address of the V-EASDF 112-2 provided by the V-SMF 105-2 to the PCO as the DNS server address of the UE 101, the UE 101 may transmit a DNS query for the PDU session to the DNS server transferred to the PCO. In this case, since the DNS server address which the home network intended to originally use is not used, the H-SMF 105-1 may transmit the DNS server address of the home network, which it intended to originally use as the DNS server address of the UE 101, to the V-SMF 105-2. The V-SMF 105-2 receiving the response message to the PDU session create request from the H-SMF 105-1 selects the V-UPF 104-2 and creates or updates an N4 session for the V-UPF 104-2 at step 515.

The V-SMF 105-2 determines whether to add a ULCL/BP and local UPF based on whether to allow a VSBO, received from the H-SMF 105-1 in step 513, and whether to allow a VSBO, received from the AMF 103-2 for the VSBO in step 506 at step 516. For example, if the V-SMF 105-2 receives the indicator indicating that an HR-VSBO is allowed from the AMF 103-2 in step 506, and the condition for adding the ULCP/BP and local UPF in the V-SMF 105-2 is met, the V-SMF 105-2 may perform a procedure for adding the ULCL/BP and local UPF.

If a request for a VSBO in the H-SMF 105-1 is authorized in step 510, and the condition for adding the ULCL/BP and local UPF in the V-SMF 105-2 is met, the V-SMF 105-2 may perform a procedure for adding the ULCL/BP and local UPF.

Adding the ULCL/BP and local UPF may be determined only when the HR-VSBO allowed indicator is received from the AMF 103-2, and a VSBO is authorized by the H-SMF 105-1.

The V-SMF 105-2 may determine to add the ULCL/BP and local UPF through its own setting according to the roaming agreement with the operator of the visited PLMN. The V-SMF 105-2 receiving the DNS server address of the home network in step 514 creates a DNS message handling rule to be transmitted to the V-EASDF 112-2. For the DNS message handling rule, the V-EASDF 112-2 creates a DNS message rule per EAS domain using the EAS deployment information, creates a DNS message handling rule in which the DNS server address of the home network received from the H-SMF 105-1 is set as the default DNS server address, and transmits the created DNS message handling rule to the V-EASDF 112-2 at step 517.

The V-SMF 105-2 transmits, to the AMF, a PCO value in which the DNS server address included in the PCO value received from the H-SMF 105-1 is set as the V-EASDF 112-2 server address. The message including the PCO value may include a PDU session creation result at step 518. The AMF 103-2 transmits the PDU session creation result received from the V-SMF 105-2 to the UE 101 at step 519.

When PDU session creation is allowed, the UE 101 may determine that roaming is allowed. The UE 101 may transmit a DNS query to the V-EASDF 112-2 set as the DNS server address at step 520. The V-EASDF 112-2 receiving the DNS query from the UE 101 forwards the DNS query to the DNS server 116-1 at steps 521 and 522. The V-EASDF 112-2 receives the DNS response message including the acknowledgment message from the DNS server 116-1, and the V-EASDF 112-2 transmits the DNS to the V-SMF 105-2 at steps 523 and 524. The V-SMF 105-2 receiving the DNS from the V-EASDF 112-2 determines session breakout. The process of determining session breakout may include determining to add/change/delete the local UPF and/or ULCL/BP UPF at step 525. The V-SMF 105-2 having determined session breakout transmits a DNS response to the UE 101 at step 526, so that the UE 101 performs roaming.

Figure 6:
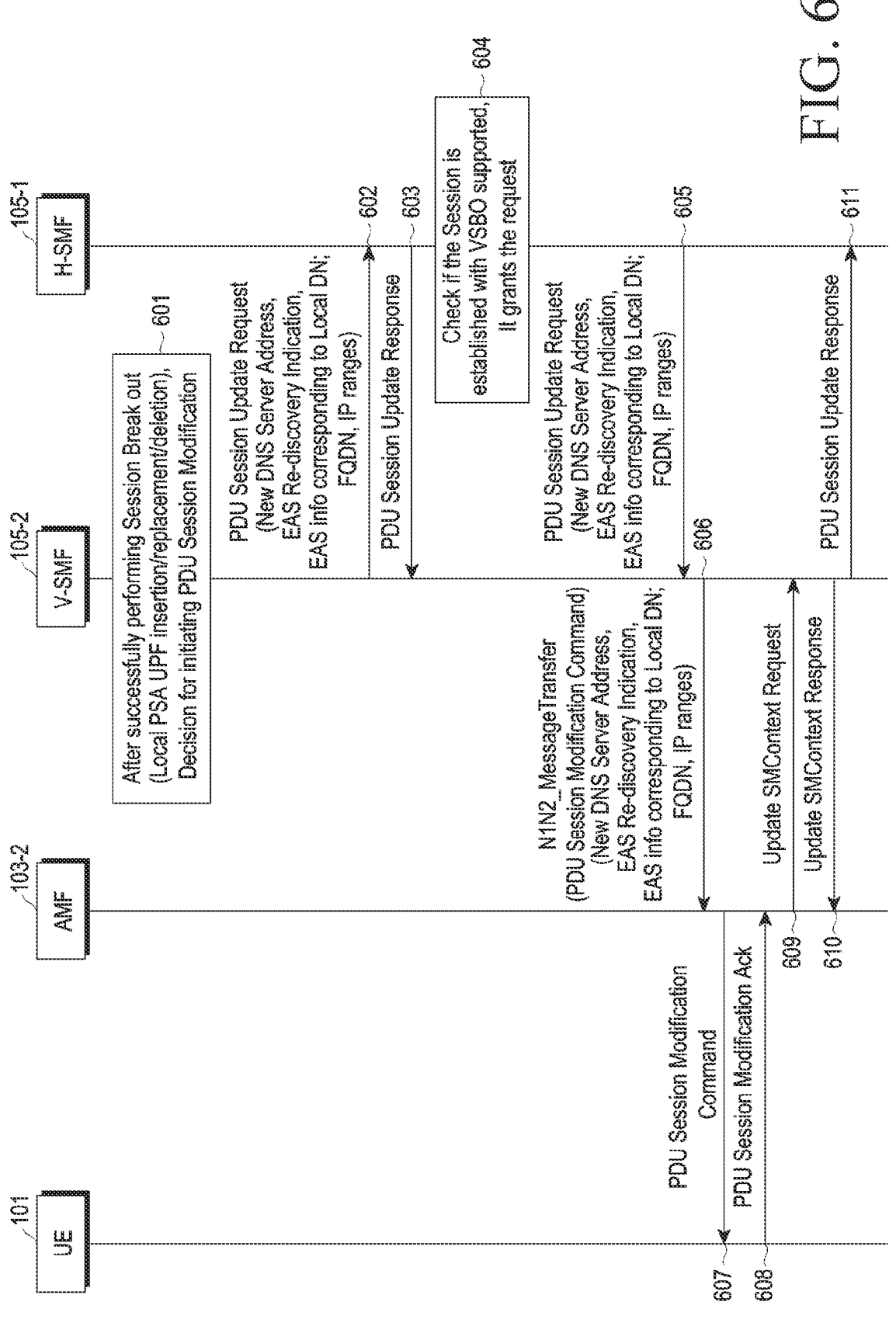
FIG. 6 illustrates a procedure for changing a VSBO session for a home routing session according to an embodiment.

FIG. 6 illustrates a procedure for changing a VSBO session for a home routing session according to an embodiment. Referring to FIG. 6, it is assumed that a session is created by the HR VSBO session create procedure described in connection with FIGS. 5A and 5B at step 601. The V-SMF 105-2 performs a session breakout procedure to add/change/delete the ULCL/BP UPF and local UPF by moving the UE 101, changing the data network access identifier (DNAI), AF traffic influence request, or DNS message report from the V-EASDF, and PCC rule or self-setting.

While the session breakout procedure is underway or after the session breakout procedure is successfully completed, the V-SMF 105-2 may need to transmit the address of a new local DNS or V-EASDF to the UE 101, when it is determined that the UE 101 needs to perform EAS re-discovery to update EAS information about the previous LDN as the session breakout procedure. The V-SMF 105-2 determines to initiate a PDU session change procedure and transmits a PDU session update request message to the H-SMF 105-1. The PDU session update request message may include the local DNS server address or V-EASDF address. The PDU session update request message may include an EAS re-discovery indicator and FQDN for identifying the EAS corresponding to the LDN, or an EAS re-discovery indicator transmission request for IP range information at step 602.

The H-SMF 105-1 transmits, to the V-SMF 105-2, a PDU session update response message including an acknowledgment message, responsive to the PDU session update request at step 603.

The H-SMF 105-1 may determine whether the DNS server address, EAS re-discovery request indicator and relevant information included in the PDU session update request received from the V-SMF 105-2 is adequate at step 604. For example, the H-SMF 105-1 may identify whether the value of the FQDN corresponding to the EAS in the LDN included along with the EAS re-discovery request indicator in the V-SMF 105-2 conflicts with the FQDN of the service provided from the home network. The H-SMF 105-1 may identify whether it conflicts with the FQDN in the FQDN list included in the node level EAS deployment information received from the PCF or NEF or the AF request of the home network. The H-SMF 105-1 may receive IP range information transmitted from the V-SMF 105-2 and identify whether it conflicts with the service provided from the home network. The H-SMF 105-1 creates a PDU session update message based on the information transmitted from the V-SMF 105-2 and performs a PDU update procedure. The H-SMF 105-1 transmits a PDU session update request to the V-SMF 105-2 at step 605. The PDU session update request message may include the new DNS server address, EAS re-discovery indicator, and IP range and FQDN which is the EAS information corresponding to the LDN.

The V-SMF 105-2 transmits a PDU session change command message to be transmitted to the UE 101 to the AMF 103-2 using a N1N2messageTransfer message at step 606. The N1N2messageTransfer message may include the information received from the H-SMF 105-1 at step 605.

The AMF 103-2 transmits the N1N2messageTransfer message received from the V-SMF 105-2 to the UE 101 via the (R)AN at step 607. The UE 101 transmits a response message for the PDU session update including an acknowledgment message to the AMF 103-2 at step 608. The AMF 103-2 transmits an SMContext update request message to the V-SMF 105-2 at step 609, and the V-SMF 105-2 sends, to the AMF 103-2, a response to the SMContext update request message. The V-SMF 105-2 transmits a PDU session update response message to the H-SMF 105-1.

Figure 7:
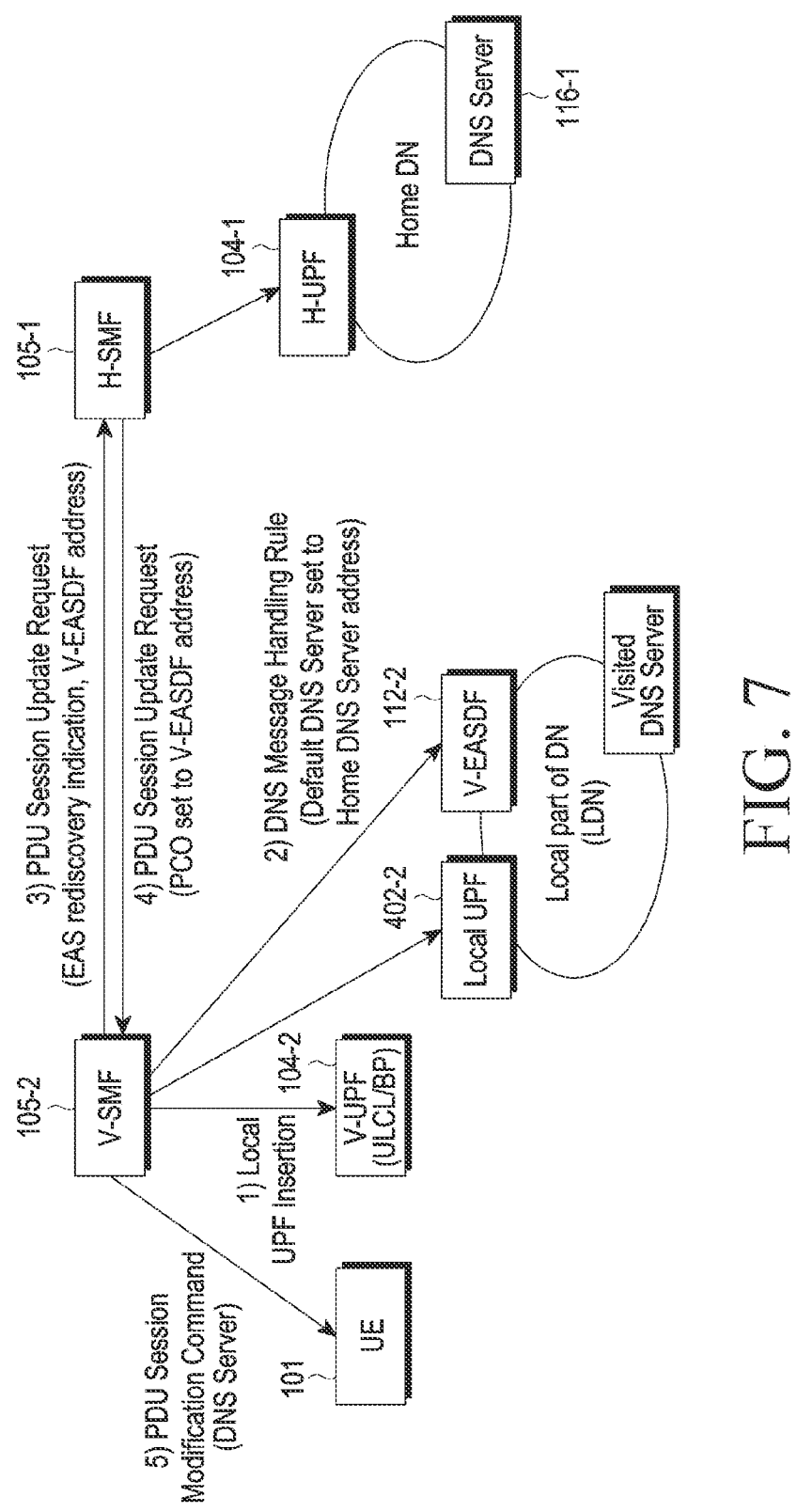
FIG. 7 illustrates a session change procedure for a home routing session according to various embodiments.

FIG. 7 illustrates a session change procedure for a home routing session according to an embodiment, described in connection with FIGS. 5A and 5B.

As illustrated in FIG. 7, 1) the V-SMF 105-2 may add a local UPF to the ULCL/BP V-UPF 401-2 at step 516, to set the UPF; 2) The V-SMF 105-2 may transmit a DNS message handling rule to the V-EASDF 112-2 in step 517; 3) the V-SMF 105-2 may transmit a PDU session update request message including the EAS re-discovery indicator and the V-EASDF 112-2 address to the H-SMF 105-1; 4) the V-SMF 105-2 may receive a PDU session update response message including the PCO value set as the V-EASDF 112-2 address from the H-SMF 105-1;c and 5) the V-SMF 105-2 may send a PDU session update command message to the UE 101.

Figure 8:
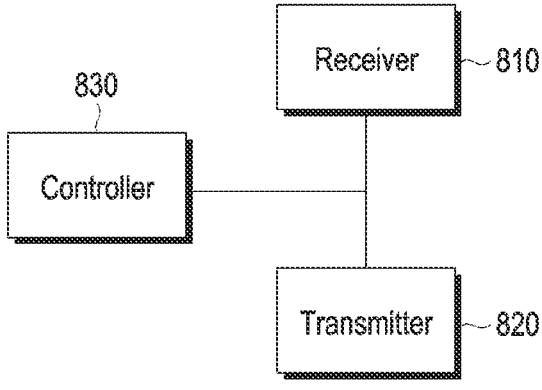
FIG. 8 illustrates a device configuration of an access and mobility management function (AMF) according to various embodiments.

FIG. 8 illustrates a device configuration of an AMF according to an embodiment.

Referring to FIG. 8, the AMF includes a controller 830, a receiver 810, and a transmitter 820.

The controller 830 controls the overall operation of the AMF, in particular, operations related to PDU session creation. The operation of controlling the AMF by the controller 830 is substantially the same as those described above in connection with FIGS. 5A to 7.

The receiver 810 receives various messages and information under the control of the controller 830.

The transmitter 820 transmits various messages and information under the control of the controller 830.

Although FIG. 8 illustrates an example in which in the AMF, the controller 830, the receiver 810, and the transmitter 820 are implemented as separate units, at least two of the controller 830, the receiver 810, and the transmitter 820 may be integrated into one. The controller 830, the receiver 810, and the transmitter 820 may be implemented as at least one processor.

Figure 9:
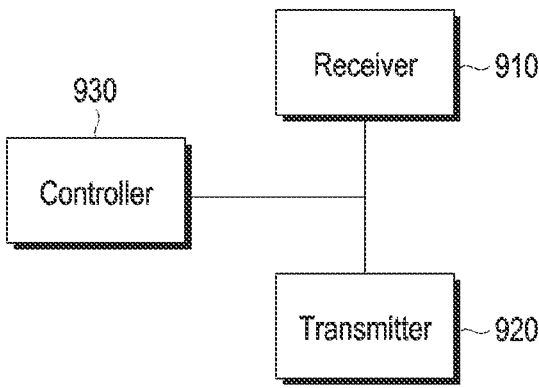
FIG. 9 illustrates a device configuration of a session management function (SMF) according to an embodiment.

FIG. 9 illustrates a device configuration of an SMF according to an embodiment. Referring to FIG. 9, the SMF includes a controller 930, a receiver 910, and a transmitter 920.

The controller 930 controls the overall operation of the SMF, in particular, operations related to PDU session creation. The operation of controlling the SMF by the controller 930 is substantially the same as those described above in connection with FIGS. 5A to 7.

The receiver 910 receives various messages and information under the control of the controller 930.

The transmitter 920 transmits various messages and information under the control of the controller 930.

Although FIG. 9 illustrates an example in which in the controller 930, the receiver 910, and the transmitter 920 are implemented as separate units, at least two of the controller 930, the receiver 910, and the transmitter 920 may be integrated into one. The controller 930, the receiver 910, and the transmitter 920 may be implemented as at least one processor.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method performed by a visited-session management function (V-SMF) configured to manage a protocol data unit (PDU) session in a wireless communication system, the method comprising:

receiving, from a visited-access and mobility management function (V-AMF), a session management-related request message including a home routed session breakout (HR-SBO) allowed indication, wherein the HR-SBO allowed indication indicates that a session breakout (SBO) in a visited public land mobile network (VPLMN) for a home routed session is allowed;

adding a user plane function (UPF) for UL-CL (uplink classifier) based on the HR-SBO allowed indication, wherein the V-SMF supports the SBO in the VPLMN for the home routed session, wherein the V-SMF supports the SBO in the VPLMN for the home routed session;

transmitting, to a home-session management function (H-SMF), a request for establishment of a session supporting HR-SBO based on the HR-SBO allowed indication, wherein the request includes an indicator related to the SBO in the VPLMN for the home routed session; and receiving, from the H-SMF, a session create response message including information on whether the SBO is authorized or not.

2. The method of claim 1, further comprising:

transmitting, to a first network entity, a message related to a domain name system (DNS) message handling rule.

3. The method of claim 2, wherein the first network entity is an edge application server discovery function (EASDF) in the VPLMN.

4. The method of claim 2, wherein the request further includes an address of the first network entity.

5. The method of claim 1, wherein:

the HR-SBO allowed indication is transmitted from a unified data management (UDM) in a registration procedure; and the HR-SBO allowed indication is determined per data network name (DNN) or single-network slice selection assistance information (S-NSSAI).

6. The method of claim 1, wherein:

the session create response message is transmitted based on subscription information from a UDM; and the session create response message includes at least one of an address of a first network entity and a DNS server address of a home public land mobile network (HPLMN).

7. The method of claim 6, wherein the DNS server address of the HPLMN is used to transmit a DNS request.

8. A visited-session management function (V-SMF) entity configured to manage a protocol data unit (PDU) session in a wireless communication system, the V-SMF entity comprising:

a transceiver; and at least one processor coupled to the transceiver and configured to: receive, from a visited-access and mobility management function (V-AMF) entity, a session management-related request message including a home routed session breakout (HR-SBO) allowed indication, wherein the HR-SBO allowed indication indicates that a session breakout (SBO) in a visited public land mobile network (VPLMN) for a home routed session is allowed;

add a user plane function (UPF) for UL-CL (uplink classifier) based on the HR-SBO allowed indication, wherein the V-SMF supports the SBO in the VPLMN for the home routed session, wherein the V-SMF entity supports the SBO in the VPLMN for the home routed session;

transmit, to a home-session management function (H-SMF) entity, a request for establishment of a session supporting HR-SBO based on the HR-SBO allowed indication, wherein the request includes an indicator related to the SBO in the VPLMN for the home routed session; and receive, from the H-SMF entity, a session create response message including information on whether the SBO is authorized or not.

9. The V-SMF entity of claim 8, wherein the at least one processor is further configured to:

transmit, to a first network entity, a message related to a domain name system (DNS) message handling rule.

10. The V-SMF entity of claim 9, wherein the first network entity is an edge application server discovery function (EASDF) entity in the VPLMN.

11. The V-SMF entity of claim 9, wherein the request further includes an address of the first network entity.

12. The V-SMF entity of claim 8, wherein:

the HR-SBO allowed indication is transmitted from a unified data management (UDM) entity in a registration procedure; and the HR-SBO allowed indication is determined per data network name (DNN) or single-network slice selection assistance information (S-NSSAI).

13. The V-SMF entity of claim 8, wherein:

the session create response message is transmitted based on subscription information from a UDM entity; and the session create response message includes at least one of an address of a first network entity and a DNS server address of a home public land mobile network (HPLMN).

14. The V-SMF entity of claim 13, wherein the DNS server address of the HPLMN is used to transmit a DNS request.

* * * * *